United States Patent
Willoughby et al.

(10) Patent No.: US 11,341,159 B2
(45) Date of Patent: May 24, 2022

(54) IN-STREAM DATA LOAD IN A REPLICATION ENVIRONMENT

(71) Applicant: INTERNATIONAL BUSINESS MACHINES CORPORATION, Armonk, NY (US)

(72) Inventors: Austin Willoughby, Voorheesville, NY (US); Gregg Andrew Upton, Santa Clara, CA (US); Paul M. Cadarette, Hemet, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 119 days.

(21) Appl. No.: 16/548,103

(22) Filed: Aug. 22, 2019

(65) Prior Publication Data

US 2021/0056120 A1 Feb. 25, 2021

(51) Int. Cl.
*G06F 16/00* (2019.01)
*G06F 16/27* (2019.01)

(52) U.S. Cl.
CPC .................................. *G06F 16/27* (2019.01)

(58) Field of Classification Search
CPC ...................................................... G06F 16/27
See application file for complete search history.

(56) References Cited

U.S. PATENT DOCUMENTS

| | | | |
|---|---|---|---|
| 7,363,537 B1 | 4/2008 | Svarcas et al. | |
| 7,594,138 B2 | 9/2009 | Abdulvahid | |
| 7,739,240 B2 | 6/2010 | Saito et al. | |
| 7,769,714 B2 | 8/2010 | Lu et al. | |
| 7,853,561 B2 | 12/2010 | Holenstein et al. | |
| 8,108,343 B2 | 1/2012 | Wang et al. | |
| 8,126,848 B2 | 2/2012 | Wagner | |
| 9,727,601 B2 | 8/2017 | Rinke et al. | |
| 9,798,792 B2 | 10/2017 | Laiho et al. | |

(Continued)

OTHER PUBLICATIONS

"LOG call", IBM Knowledge Center. Retrieved on May 8, 2019 from the Internet URL: <https://www.ibm.com/support/knowledgecenter/en/SSEPH2_13.1 0/com.ibm.ims13.doc.apr/ims_logcall.htm>, 5 pgs.

"LGGF—General Log Format", IBM Knowledge Center. Retrieved on May 8, 2019 from the Internet URL: <https://www.ibm.com/support/knowledgecenter/en/SSGMCP_5.3.0/com.ibm.cics.ts.doc/dfhs4/DFHLGGFK.html>, 8 pgs.

(Continued)

*Primary Examiner* — Khanh B Pham
(74) *Attorney, Agent, or Firm* — William Hartwell; Matthew M. Hulihan; Heslin Rothenberg Farley & Mesiti PC

(57) ABSTRACT

In-stream data load in a replication environment includes extracting source data from a source data store that is in a replication relationship with a target data store. A replication facility replicates to a target system changes made to the source data store. The replication facility includes a replication engine that reads a replication log into which the replication facility records the changes and sends the changes to the target system for application to the target data store. The extracting is performed by an extract utility separate from the replication engine. The in-stream data load also includes injecting, by the extract utility, the extracted source data into the replication log in-line with the changes recorded in the replication log by the replication facility and according to a format such that the replication engine can read and send the source data to the target system.

19 Claims, 6 Drawing Sheets

(56) References Cited

U.S. PATENT DOCUMENTS

| | | |
|---|---|---|
| 10,013,316 B2 | 7/2018 | Cadarette et al. |
| 10,229,152 B2 | 3/2019 | Bourbannais et al. |
| 10,394,485 B1 | 8/2019 | Chen et al. |
| 10,484,179 B1 | 11/2019 | Natanzon et al. |
| 2005/0262097 A1 | 11/2005 | Sim-Tang et al. |
| 2008/0215593 A1 | 9/2008 | Holt |
| 2010/0114831 A1 | 5/2010 | Gilbert et al. |
| 2012/0150803 A1 | 6/2012 | Zhu et al. |
| 2013/0325824 A1 | 12/2013 | Shoens |
| 2014/0229437 A1 | 8/2014 | Takeuchi et al. |
| 2017/0046082 A1* | 2/2017 | Cadarette ............ G06F 11/1474 |
| 2017/0371914 A1 | 12/2017 | Bourbonnais et al. |
| 2018/0336105 A1 | 11/2018 | Cadarette et al. |
| 2019/0325055 A1* | 10/2019 | Lee .................... G06F 16/1734 |
| 2019/0332582 A1* | 10/2019 | Kumar ................. G06F 16/273 |
| 2021/0026831 A1* | 1/2021 | Mishra ................... H04L 63/20 |
| 2021/0216502 A1 | 7/2021 | Subramanian et al. |
| 2021/0326359 A1 | 10/2021 | Upton et al. |

OTHER PUBLICATIONS

Mell, Peter, et al., "The NIST Definition of Cloud Computing", NIST Special Publication 800-145, Sep. 2011, Gaithersburg, MD, 7 pgs.

"Developing a conflict exit", IBM | IBM Knowledge Center, retrieved on Apr. 16, 2020 from the Internet URL: <https://www.ibm.com/support/knowledgecenter/SS4T2J_11.3.0/com.ibm.swg.im.iis.clz.imsr.overview.doc/topics/iyitoiconfexitdev.html>, 4 pgs.

"Format of the data capture log records", IBM | IBM Knowledge Center, retrieved on Apr. 16, 2020 from the Internet URL: <https://www.ibm.com/support/knowledgecenter/SSEPH2_15.1.0/com.ibm.ims15.doc.spr/ims_format_captureddata.htm>, 4 pgs.

"Parameters for conflict exits", IBM | IBM Knowledge Center, retrieved on Apr. 16, 2020 from the Internet URL: <https://www.IBM.com/support/knowledgecenter/SS4T2J_11.3.0/com.ibm.swg.im.iis.clz.imsr.overview.doc/topics/iyitoiconfexitparms.html>, 12 pgs.

List of IBM Patents or Applications Treated as Related, Dec. 30, 2021, 2 pgs.

* cited by examiner

IN-STREAM DATA LOAD IN A REPLICATION ENVIRONMENT

BACKGROUND

Replication products typically require that data be seeded in the target data store before replicating changes in order to avoid data inconsistencies. Seeding the data provides a starting point for the target data store to receive on-going changes through replication. Re-seeding the target data store may also be necessary if there is a problem that causes inconsistencies between the source and target.

To accomplish this task, there is typically an "internal refresh" option provided by the replication product and/or an "external refresh" option. An internal refresh is controlled within the replication product, which accesses the source data and sends the data to the target. Additionally or alternatively, the target may pull the source data via functions of the replication product. This provides convenience for users in that the replication product does the work of accessing and formatting source data for the target data store.

In contrast to an internal refresh, a user controls an "external refresh", whereby the user uses a known copy of the source data to create a point-in-time consistent target copy by transferring the data to the target and formatting the source data for the target data store. The formatting might include transformation(s) of the source data to arrive at a format expected or desired at the target. The user and the external tooling used in the external refresh scenario are responsible for ensuring that the data matches in order to avoid data inconsistencies during replication.

SUMMARY

Shortcomings of the prior art are overcome and additional advantages are provided through the provision of a computer-implemented method. The method includes extracting source data from a source data store. The source data store is in a replication relationship with a target data store, in which a replication facility replicates to a target system changes made to the source data store for application of those changes to the target data store. The replication facility includes a replication engine configured to read a replication log into which the replication facility records the changes and send the changes to the target system for application to the target data store. The extracting of the source data is performed by an extract utility separate from the replication engine. The method also includes injecting, by the extract utility, the extracted source data into the replication log in-line with the changes recorded in the replication log by the replication facility. The injecting includes the extract utility injecting the extracted source data into the replication log according to a format configured for the replication engine to read and send the extracted source data to the target system.

Further, a computer system is provided that includes a memory and a processor in communication with the memory, wherein the computer system is configured to perform a method. The method extracting source data from a source data store. The source data store is in a replication relationship with a target data store, in which a replication facility replicates to a target system changes made to the source data store for application of those changes to the target data store. The replication facility includes a replication engine configured to read a replication log into which the replication facility records the changes and send the changes to the target system for application to the target data store. The extracting of the source data is performed by an extract utility separate from the replication engine. The method also includes injecting, by the extract utility, the extracted source data into the replication log in-line with the changes recorded in the replication log by the replication facility. The injecting includes the extract utility injecting the extracted source data into the replication log according to a format configured for the replication engine to read and send the extracted source data to the target system.

Yet further, a computer program product including a computer readable storage medium readable by a processing circuit and storing instructions for execution by the processing circuit is provided for performing a method. The method extracting source data from a source data store. The source data store is in a replication relationship with a target data store, in which a replication facility replicates to a target system changes made to the source data store for application of those changes to the target data store. The replication facility includes a replication engine configured to read a replication log into which the replication facility records the changes and send the changes to the target system for application to the target data store. The extracting of the source data is performed by an extract utility separate from the replication engine. The method also includes injecting, by the extract utility, the extracted source data into the replication log in-line with the changes recorded in the replication log by the replication facility. The injecting includes the extract utility injecting the extracted source data into the replication log according to a format configured for the replication engine to read and send the extracted source data to the target system.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

In an internal refresh approach, with the convenience of the replication product doing the work of accessing and formatting source data for the target data store comes drawbacks, for instance the necessity for configuration and requirement for source data access. In addition, there are potential negative performance implications due to limitations in how the source data is refreshed to the target using a general data access approach that may not take advantage of optimizations available in the source data store access methods. The external refresh approach requires even more effort on the part of the replication user, but could perform better in certain applications, for instance when refreshing larger data sources.

Described herein are approaches for in-stream data load in a replication environment. Specifically, with a source and target being in a data replication relationship in which changes made to data in a source data store at a source side are replicated to a target side for application to a target data store, aspects described herein present an extract utility that executes external to the replication engine, reads data from the source data store, and inject records into the replication log that is being read by the replication engine pursuant to the replication facility's typical operation. The injected records are placed in-stream with the conventional replication records being written into the replication log, for instance the replication records being written into the log by the database component or other component(s) of the replication facility. The replication engine, working through the entries in the log, reads and replicate the extracted data to the target side for desired handling.

Figure 1:
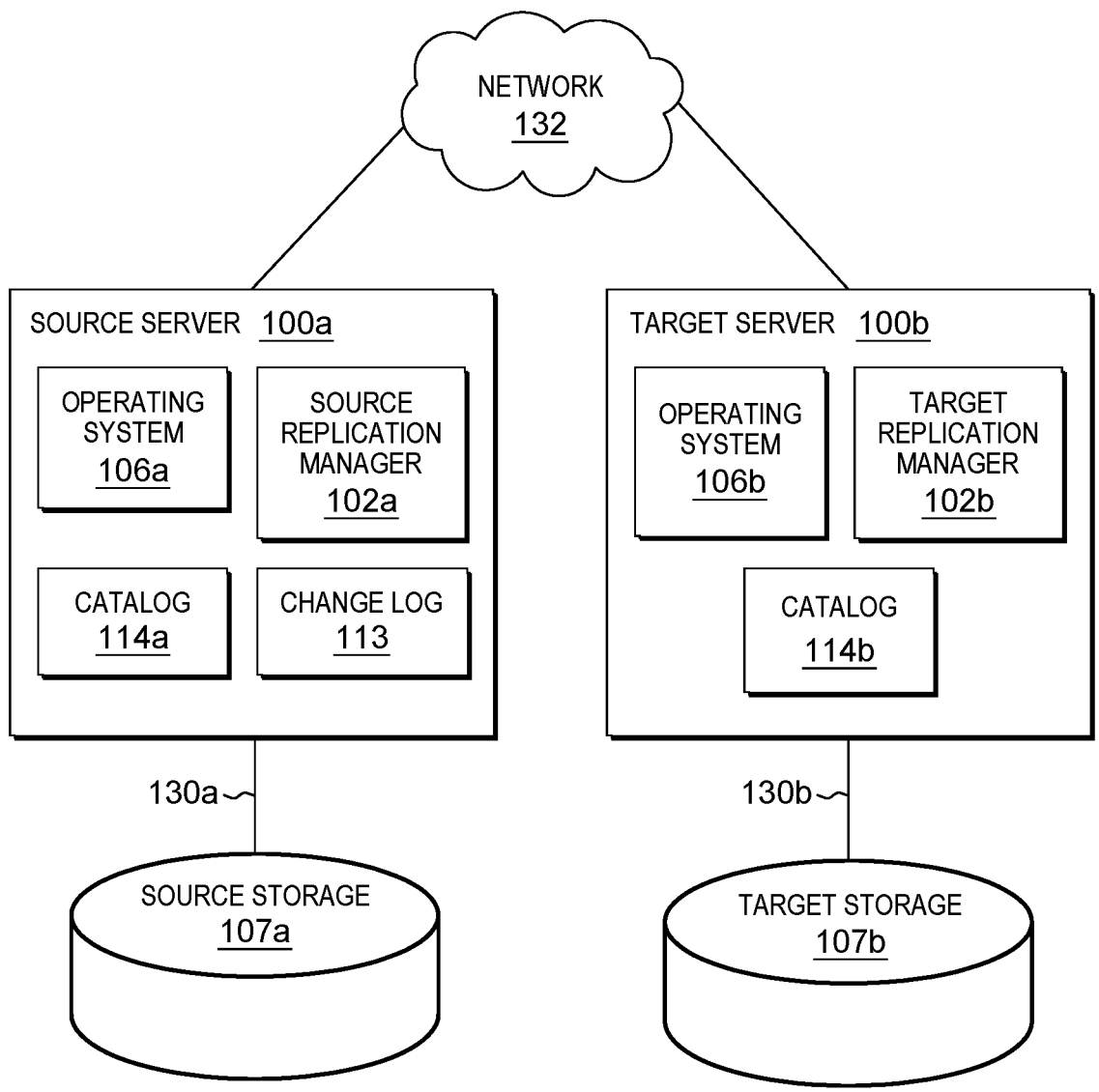
FIG. 1 illustrates an embodiment of a replication environment to incorporate and/or use aspects of described herein.

An embodiment of a replication environment to incorporate and/or use aspects described herein is depicted in FIG. 1 for context. The environment includes a source server 100a and a target server 100b, which include a source replication manager 102a and target replication manager 102b, respectively, to replicate a source data set (source data) in a source storage 107a to a target data set in a target storage 107b. The replication manager may also be referred to as a replication engine. Either server device 100a, 100b may function as the source and target server of the replication operation. The source server 100a may receive updates to the records in the source storage 107a from a client (not shown).

A data set includes a collection of data intended to be stored in a same logical allocation of data, such as data from a single application, user, enterprise, etc. A data set may include separate files or records, or include a single file or record. Each record or file in the data set may include extents of data or tracks.

The servers 100a, 100b each include an operating system 106a, 106b to manage the storage of data sets in volumes of the source/target storage 107a, 107b. The operating system 106a, 106b may include any operating system for managing data sets in volumes or other logical data structures. The operating system 106a, 106b may further include a particular component for managing data in the volumes.

In certain embodiments, data stored in a storage 107a, 107b may conform to the Virtual Storage Access Method (VSAM) used for storing and accessing data sets, introduced by International Business Machines Corporation, Armonk, N.Y. In VSAM and other embodiments, the data sets may include indexed data sets having records that are indexed according to a primary key that is used to locate the records in the data sets. In VSAM embodiments, the data sets are collections of records grouped into control intervals in a fixed area of the storage space, called control areas. Further, the VSAM records are indexed by a key and relative byte address. Data set indexes may provide an index to the records in an indexed data set. For instance, in Data Facility Storage Management Subsystem (DFSMS; a trademark of International Business Machines Corporation) implementations, the data set may include a Key Sequenced Data Set (KSDS) used in the Virtual Storage Access Method (VSAM) storage, where each record in the KSDS data set has a unique key in the indexes used to locate the record in the data set. The operating systems 106a, 106b may further maintain a catalog 114a, 114b that has further information on the data sets configured in the volumes of the storage 107a, 107b. The form of the catalogs (114a/114b) can vary, but generally contains metadata about the source/target objects being replicated.

Embodiments may apply to operating systems that use different types of allocation or volume tables than a virtual table of contents (VTOC), different types of metadata on the allocation of storage to data sets than a VSAM Volume Data Set (VVDS), and different types of storage formats, access methods and architectures than VSAM.

In the embodiment of FIG. 1, the records of the source data set in source storage 107a are replicated to a target data set in target storage 107b. In the embodiment of FIG. 1, the data sets may be of the same format, such as VSAM. In alternative embodiments, the records of the source data set may be replicated to target data store types other than a target data set. For instance, in addition to being a target data set, the target data store may alternatively include a database or other data structure into which the records from the source data set are inserted. In this way, the target data store may be in an entirely different format than the source data set. For instance, in one embodiment, the source data set may include an indexed data set, such as a VSAM data set, and the target data store may include a relational database or other data structure having an entirely different format and data structure than the source data set.

To replicate a source data set to a target data store, e.g., target data set in target storage 107b, some approaches cause the source replication manager 102a to perform an initial refresh or copy of the source data set to the target storage 107b by way of the target server 100b.

The source replication manager 102a accesses a change log 113, which can also be referred to as a replication log and/or transaction log, having changes to the records in the source data set. The change log 113 buffers changed records for transmission to the target data store being replicated to copy over any changes that occur during and after the initial copy creation of the target data set. The records in the change log 113 include the index key as well as the data for the record, such as the entire image.

Some aspects of the embodiment of FIG. 1 assume a homogeneous VSAM replication environment, though those with ordinary skill in the art will readily recognize that aspects described herein can work with other types of environments, for instance a homogeneous IBM Information Management System (IMS; offered by International Business Machines Corporation, Armonk, N.Y.) database replication environment, relational database system replication environment, or a heterogeneous replication environment where the source and target are different, as examples. Source storage 107a can include VSAM files, IMS databases, or relational database tables or views, as examples, and target storage 107b can include those same objects, or other kinds of objects, for instance Hadoop® files or Kafka® queues (HADOOP and KAFKA are trademarks of The Apache Software Foundation, Forest Hill, Md.), as examples. Thus, there is no requirement that the source and target stores be the same kind of object. Additionally or alternatively, although FIG. 1 depicts an example having a replication manager, aspects described herein also apply to environments where the target is/includes, instead, a publication environment (e.g. message queue) where messages are being written.

Figure 2:
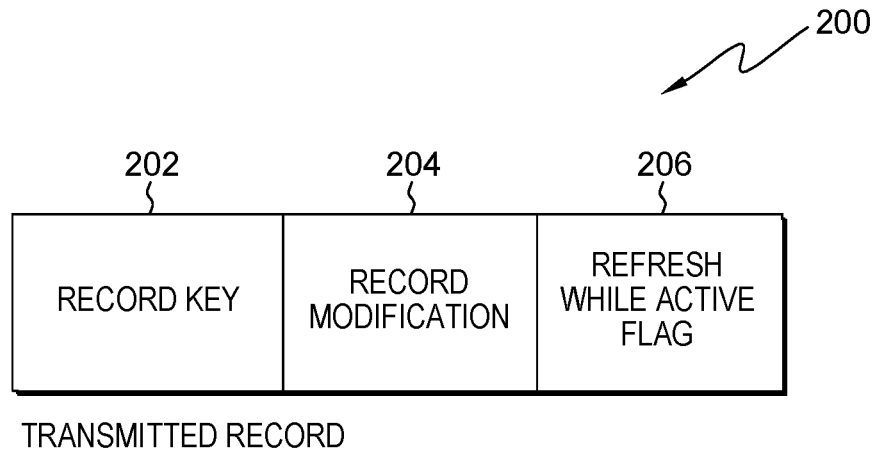
FIG. 2 illustrates an embodiment of a change record for transfer to a target data store.

FIG. 2 illustrates an embodiment of a change record for transfer to a target data store. The change record 200 is a transmitted record that the source replication manager 102a to include in the target storage, for instance a target data set thereof. The transmitted record 200 includes a record key 202 uniquely identifying the record; a record modification 204, such as the change to the data or full copy of data; and a refresh while active (RWA) flag 206 indicating whether the source data set was open to a transaction or application.

The RWA flag 206 is used to reflect that the change indicated by the transferred record 200 from the log 113 may already be reflected in the target data set and does not need to be reapplied to the target storage if already reflected. The RWA flag 206 addresses the situation where refresh processing (i.e., the initial copy creation) is performed concurrent with change replication, and changes are seen at the target to records that have not yet been refreshed. The target replication manager 102b will attempt to, e.g., delete a record yet-to-be refreshed, but by processing the RWA flag 206, will ignore errors indicating the key was not found. This RWA processing may only occur from the start of refresh processing to the end of refresh processing. At that point, there may be no further transactions that were in-flight when the refresh occurred. In certain embodiments, the times and flags are stored in metadata maintained by the source replication manager 102a so that this processing is active even if the replication system is restarted.

The source 107a and target 107b storages may each be implemented in one or more storage devices, or an array of storage devices configured as Just a Bunch of Disks (JBOD), Direct Access Storage Device (DASD), Redundant Array of Independent Disks (RAID) array, virtualization device, tape storage, flash memory, etc. The storage devices may include hard disk drives, solid state storage device (SSD) that includes solid state electronics, EEPROM (Electrically Erasable Programmable Read-Only Memory), flash memory, flash disk, Random Access Memory (RAM) drive, storage-class memory (SCM), etc., Phase Change Memory (PCM), resistive random access memory (RRAM), spin transfer torque memory (STM-RAM), conductive bridging RAM (CBRAM), magnetic hard disk drive, optical disk, tape, etc. Although a certain number of instances of elements, such as servers, storages, active and inactive copy relationships, etc., are shown, there may be any number of these components.

The source replication manager 102a and target replication manager 102b may include software programs in a memory executed by a processor. In an alternative embodiment, some portion or all of the programs 102a, 102b, 106a, 106b may be implemented in a hardware component, such as a dedicated integrated circuit, e.g., Application Specific Integrated Circuit (ASIC), expansion card, etc.

Although the source replication manager 102a and target replication manager 102b are shown as separate components, in alternative implementations the functions performed by these components 102a, 102b may be implemented in a single program component in a single computer system or in more than two program components in more than two computer devices.

The source 102a and target 102b replication managers may be used by client nodes to recover objects as part of a restore operation.

The servers 100a, 100b communicate with their respective storage 107a, 107b via connection 130a, 130b. The connections 130a, 130b may include one or more networks, such as a Local Area Network (LAN), Storage Area Network (SAN), Wide Area Network (WAN), peer-to-peer network, wireless network, etc. Alternatively, the connection 130a, 130b may include bus interfaces, such as a Peripheral Component Interconnect (PCI) bus or serial interface.

The source server 100a and target server 100b may be implemented in separate computer devices that communicate over a network 132, such as a local area network (LAN), storage area network (SAN), wide area network (WAN), etc., which may be connected or separate from the networks 130a, 130b. In further embodiments, the source server 100a and target server 100b may be implemented on one or two computer systems. If the source server 100a and target server 100b are in the same system, then they may communicate over a bus or via memory.

Internal and external refresh possibilities discussed previously have drawbacks, for instance:

Exclusive access to source data: It may be considered advantageous to refresh data while the source data store is not being updated. This can require limiting the availability of the data to the source application(s). Exclusive access to source data during refresh activities helps ensure an accurate target replica but can be problematic in a replication environment where the source data requires nearly 24×7 availability to the source application(s). Placing the source data in read-only mode or taking it offline prevents uncommitted data from being refreshed (i.e. transferred to the target) and can avoid read locks. However, either of those approaches may impact a source application's ability to access source data.

Efficient access of source data: An internal refresh may be convenient for the user, but may not take advantage of source data source optimizations. For example, an IBM Information Management System (IMS) database (offered by International Business Machines Corporation) may need to be scanned multiple times if there are several replication mappings built over different segments. IMS is hierarchical, so two children segments of a common parent could be the basis for two different table mappings A and B. A general approach is to consider each replication mapping (A and B) separately without knowledge that the multiple mappings could be based on different segments in the same database that could be addressed by one single scan, rather than multiple scans. Multiple scans occur in existing replication products for varying reasons. As one example, IMS data is replicated by leaf segment; if multiple leaf segments in the database are being replicated, a scan would be performed for each. As another example, IMS and VSAM data have similar problems with views over the data based on record data that redefines the layout. It is common to redefine a VSAM record or IMS segment to have multiple meanings to an application based on some field in the data. As described below, in accordance with aspects herein the replication could occur using a single scan.

Refresh for a replication mapping must run from start to end successfully or restart from the beginning: An interruption in the replication server during an internal refresh process conventionally requires the user to restart refresh for the replication object from the beginning. When the replication mapping is based on a very large source data store, a significant amount of CPU and clock time could be wasted if there is a transient error during refresh, for instance a TCP/IP connection interruption.

Verification of target replica: Once replication is active, it may be difficult to prove the accuracy of the target replica. Some approaches provide ways to see differences by comparing the source and target, but this can be difficult in environments that may have unkeyed or non-uniquely keyed data. Verification can also be difficult in an environment where data being compared may be constantly changing.

Aspects described herein introduce a new extract utility that executes external to the replication engine to read/extract data from a source data store and inject new user records into the replication log. The new user records contain the current image of the source data store record that was extracted. These are injected into the replication log, in-stream with other changes (replication changes) that are occurring, for instance the change records being written by IBM IMS for recovery or an IBM Customer Information Control System (CICS; offered by International Business Machines Corporation) facility in a VSAM implementation, as examples. The existing log reader of the replication engine will naturally see these new user records injected by the extract facility described herein as the log reader reads through the log blocks. The extract utility could be executing separate from the replication facility executing at the source or could be executing internal to the replication facility (e.g. as a thread running in the same process). In either situation, the utility executes separately from the replication engine of the replication facility.

The extract utility extracts data from the source data store and writes it into the replication log, for instance for purposes of an in-stream refresh as one example. This also provides for additional capabilities described herein, for instance parallel load enablement, active load enablement (loading mapping while active data continues to be replicated), data validation, and refresh restart, among other capabilities.

Figure 3:
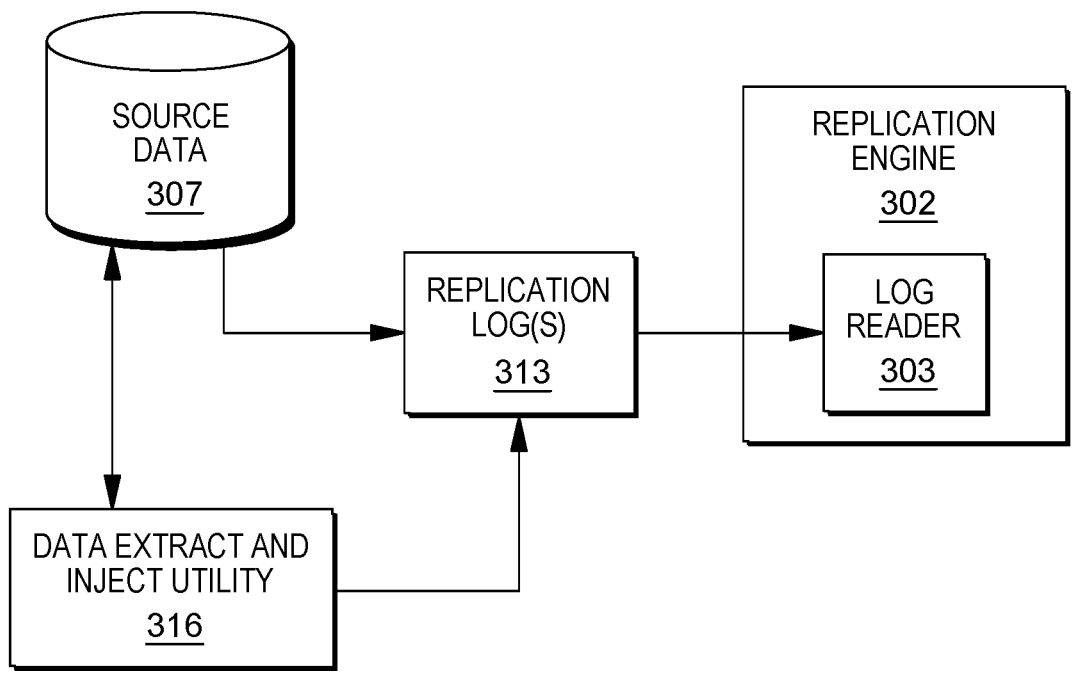
FIG. 3 depicts further details of a source side of a replication environment to incorporate and use aspects described herein.

FIG. 3 depicts further details of a source side of a replication environment to incorporate and use aspects described herein. Referring to FIG. 3, source data is stored in a source data store 307. Changes made to data in the source data store 307 are reflected in replication log(s) 313. A replication engine 302 executing on a system, which may be the same or different from a system storing/writing to the replication logs, includes a log reader 303 that reads the changes reflected in the replication log(s) and transfers those changes to the target side. Meanwhile, and in accordance with aspects described herein, the data extract and inject utility 316 (referred to herein as "extract utility" or just "utility" for short) reads the source data store 307 for an object and injects 'refresh' records into the replication log 313. Rather than the replication facility pulling from the database (IMS or VSAM are used in examples described herein), the utility 316 effectively changes the refresh operation into a push of data into the replication flow by another address space (i.e. the utility 316) that reads the data store 307 and writes log records containing the data record image.

In some embodiments, the utility writes the following types of records:

(i) Refresh start—a first record of a sequence from the utility 316; indicates start of in-stream data load/refresh.

(ii) Segment/source data image—written as a 'refresh' (sometimes referred to as "RFSH") record.

(iii) Periodic checkpoint/commit—Many replication approaches work on 'units of recovery' sending only committed data to the target. To tell the source replication engine when the data is considered set to send to the target, the approach, after building up an amount of refresh records (for instance 100-200), can write a checkpoint indicator ending that group of changes that are accumulating for the refresh process, to confirm that the group can be sent to the target. The utility can therefore periodically write to the replication log a checkpoint record indicating completion of a unit of recovery for the data refresh. These may be more frequent when using read locks. Alternatively, in some embodiments, such as when the replication engine is to determine grouping, the utility writes refresh records without commit records.

(iv) Refresh end—the last record of a sequence from the utility 316; indicates end of in-stream data load/refresh.

While conventional replication products can capture new data inserts by an application, a refresh, by definition, is to refresh data to the target that already exists on the source, rather than simply observing in real-time new data being inserted/added and indicating that insert. Embodiments of the extract utility described herein read source data, finding that it exists, and write a corresponding record into the replication log. Thus, the extracting and the injecting by the utility can be performed as part of a data refresh, in which the target data store initially does not store the source data, and the extracted source data is seeded to the target data store as target data. This seeding may be done prior to applying replicated changes, passed to the target system before during or after the seeding pursuant to a replication relationship, affecting the seeded target data. In this manner, the utility can seed data that is in the scope of a replication subscription with changes flowing to the target pursuant thereto. The refresh of the data can occur as those changes are being made and indicated in the replication logs by the replication facility. In some situations, the replication facility could be replicating changes to data that is refreshed according to the processing of the extract utility described herein either before, during, or after the utility reads the source data to seed it to the target.

The injected records can follow some pre-defined, agreed-upon format so they may be understood by the replication engine. In some examples, the replication engine can be configured (e.g. programmed) to understand/process the new 'refresh' records. In specific examples, the engine can include program code to handle refresh records similar to or the same as how the engine currently handles 'insert' type log records.

'User' log records are common for some data sources. For example, IMS documents a LOG call to write user data to the IMS log with a particular type. Any of various record types may be used by applications in order to write the information that the application wants logged. The CICS Transaction Server offered by International Business Machines Corporation documents something similar that could be used for VSAM data using its EXEC CICS WRITE JOURNALNAME Application Programming Interface (API).

Thus, IMS, VSAM, and other database types can provide for writing user log records. Some embodiments can exploit this to create a stream of refresh data in the replication log(s) as described in further detail herein. Prior to writing the first record image in a sequence, a refresh start indicator/record is written. This indicates to the replication engine that a stream of refresh data will occur for given object(s), which may also be explicitly specified for the engine. The implementation of responding to in-stream replication refresh log records may vary by data store. One implementation is for the replication engine at the source to (i) communicate to the replication engine at the target that the target replication engine should truncate its replica of the data and (ii) begin flagging all further changes for the specified object(s) with a "refresh while active" flag described previously. This flag would allow for the target table to use adaptive apply processing rules as it receives data for records that may not yet be in that target table.

At least some records written by the utility can be referred to herein as 'refresh' (RFSH) log records. The refresh log records may be injected into the replication log by the utility using features of the data store (e.g. IMS user log records for instance). In specific examples, newly inserted data is written in an existing ISRT (insert) type log record for an IMS database, or a CICS General Log Format (LGGF) WRITEADDCOMPLETE record for a VSAM database, or in a format based thereon. Thus, injection of the records by the utility can include injecting the extracted source data into the replication log according to a format configured for the replication engine to read and send the extracted source data to the target system as if the records were being recorded into the replication log by another component recording changes, for instance other components of the replication facility or the database itself. Additionally, injection of the extracted source data according to a format configured for the replication engine to read and send the extracted source data to the target system can include writing log records to the replication log in a format based on an existing insert record format recognized by the replication engine.

For homogeneous replication, in which the source and target utilize the same database type, the RFSH record can be sent to the target by the replication engine and the target can be configured to perform any desired behavior in response to receiving these records. For an IMS database, the target could, as an example, delete the root to remove all of its children on the basis that it expects to receive a flow of RFSH records for the database records under this root. The specific format of the RFSH record could be exposed to allow users of the utility to write their own refresh tools for target processing that is called responsive to receiving RFSH records.

It is conceivable, and in some cases expected, that a data refresh by way of a utility described herein will write a large volume of user log records into the transaction log for handling by the replication facilities at the source and target, including the replications engines thereof. However, the handling of this large volume is not a problem for mainframe source data store environments, as they typically already manage a relatively massive amount of log data. One million log records may represent a moderate size database but this is not an excessive number of log records for database subsystem. Some replication products can read 100,000 records per second from logs. The extract utility described herein can inject a new user log record for every distinct database record that it is configured to extract, and this is expected to be barely noticeable respective to overall log contents. The extract utility could inject a log record for every database record encountered even if most or all are already at the target. Typically during a refresh, one of the setup steps is to force a 'truncate' at the target to delete the database data. In these cases, the refresh would typically be scoped to include all source records for injection. In embodiments, the utility would write a refresh start record to initiate a truncate at the target, then read every database record and write the data of each read record into the replication log as a new refresh record.

The extracting of the source data can include extracting from the source data store an initial set of source data, and filtering that extracted initial set of source data into the extracted source data that is to be injected into the replication log. The filtering can be done according to a scope of records, in the source data store, that are targeted for processing, for instance those targeted for refresh. The filtering can be done based on filtering criteria. This may be useful in any of various situations, such as one in which certain records (say ones beginning with the letter 'D') at the target have been corrupted. The filter criteria can therefore target keys that start with the letter 'D'. In some cases where the filter criteria is not based on a key field, the extract utility could extract each piece of data from the source data store (e.g. segment or record) and consider that data against the filtering criteria to determine whether to inject a refresh record or ignore the data and move to the next piece of data. Additionally or alternatively, a scan could use filtering to match multiple segments during one scan representing a subset of the source data store.

The data store records that are read by the utility may therefore be filtered by the utility into a set of records for refresh processing. The data for injection can be formatted into replication log records (refresh log records) as described above, for instance records that follow the form of an insert, carrying the current source record image. The refresh log records can be injected into the replication log by the utility using features of the data store.

The utility could be capable of filtering over selected replication objects, such as VSAM records or clusters, IMS database segments, or database descriptors (DBDs), for instance. For IMS and VSAM, segment or record offset and comparisons can be made for view processing, though complex selection criteria might be best done by capturing all database records for the segment and directing or letting the replication engine perform filtering. While possible and not excluded by aspects described herein, in one embodiment data filtering within the segment is not included and would leave view evaluation in the receiving replication engine where RFSH records could be discarded.

Existing Change Data Capture (CDC) protocols do not provide for parallel refresh of objects within the same subscription. Since multiple objects could be mapped over the same database descriptor but different leaf segments, it is also possible that multiple scans of the database may be necessary to find all the segments that need to be refreshed. This can be time consuming, especially in a database that has many records but in which the leaf segment mapped is sparsely populated in the database. Such a database requires a lot of reads only to discover the database record does not contain data for the leaf segment that was mapped.

Similarly, a segment or VSAM record could be redefined to contain multiple record types, and current approaches would make multiple passes/scans to replicate the data. In contrast, the utility described herein can pull all record types in a single pass/scan of the data store. The extracting of the source data can be performed in a single scan of the source data store, even wherein the scope includes multiple replication objects scanned during the single scan. The injecting injects records into the replication log for the extracted source data recognized for each of the multiple replication objects. This is the case even when the multiple replication objects include multiple Virtual Storage Access Method (VSAM) records or multiple Information Management System (IMS) database segments. Conventional offerings would require multiple scans of the source data store, whereas aspects described herein enable handling of both by way of a single scan.

The source can effectively refresh such multiple table objects in parallel by responding to the new RFSH records and sending them to the target, for instance as inserts (in the heterogeneous situation where the source and target are different database types) or RFSH records (in the homogeneous situation) because records for multiple segments/records can be intermingled in the replication log. In some examples, multiple utilities refreshing data of a distinct scope execute concurrently, while in other examples a single utility scans the database for multiple segments/records.

Since the utility may be able to scan the source database once and write record images for multiple segments, this avoids scanning the source data store multiple times if multiple segments are mapped as different tables in the same subscription (heterogeneous). It is also possible to implement area-level parallel refresh over one or more objects for a Data Entry Database (DEDB) by running multiple utilities concurrently for multiple areas.

In the parallel scenario, a plurality of extract utilities are concurrently executing. Each utility is associated with a different key range or database area filter than is associated with each of the other extract utilities of the plurality of extract utilities, and therefore each is configured to extract a respective set of source data from the source data store according to its associated key range or database area filter. In cases that include VSAM extract filtering on the primary key, the parallel extract utilities act as multiple, independent database readers processing disjoint sets of keys. Having multiple refreshes running by key range or database area allow each extract utility to read only a portion of the database, which leads to faster injection of the refresh records and therefore faster completion of the refresh.

Further, it may be possible to "fix-up" specific records in the database by providing keys for which the utility is to generate RFSH records—perhaps after an unplanned outage where data was stranded on the lost site. As part of the "fix-up" processing, a user could define behaviors and/or use an exit to cause a duplicate key to be forced at the target. In one example, a 'delete' is sent in advance of the refresh. In another example, a conflict exit (perhaps a custom exit) is called, while in another example an adaptive apply behavior is used. The target could be programmed to cause the record to 'overlay' the target rather than being ignored.

When the refresh utility operates without locking, it can limit impact on source applications with which it is sharing access to the source data. However, if a database record is read without locking, then it is possible to process data that is later rolled back. This can result in data at the target that never really existed (at least was never hardened or committed) at the source. To avoid locking and possibilities of rollbacks, and to reduce the time of the refresh by avoiding locks, existing internal refresh solutions could put the source database in read-only access mode before starting a refresh. For IMS, this may be accomplished either by starting the database in RD (for read only processing) or using the IMS/DBR command. For VSAM, the sphere may be made available exclusively to the replication address space. However, both solutions lock out other source applications that might want to make updates during the refresh time.

Rollbacks may be rare in production applications. If the replication product/facility assumes the source application will not roll back, then the extract utility could access the data without locks while being assured that the replication product is not replicating data that may not be committed in the source database. In some scenarios described herein, records are read without read locking and the source server is responsible for detecting a rollback. If a rollback occurs, a record will be written into the database log and the server can invalidate the refresh. A rollback will therefore be seen by the replication engine for a unit of recovery that involves one of the database objects that the utility is trying to refresh. In this case, a refresh failure can be declared. Initially, the server could stop the subscription and declare a replication error. However, other behaviors are possible, such as initiating a restart of the refresh through some communication with the extract utility's address space. The replication engine can be made aware of a start refresh by way of the start refresh indicator that the utility injects into the replication log, and that the engine may be programmed to process accordingly.

Source database read locking may be preferred, when possible, to allow the utility to run and avoid later marking the refresh invalid due to a rollback. The utility may communicate on the refresh start indicator whether the source server executing the replication engine should examine for and address (e.g. fail) if a rollback impacts the database. In this regard, the utility can indicate to the replication engine whether to examine for a rollback impacting the source data store and, if so, whether to abort the data refresh based on observing a rollback. If reading without locks, uncommitted data may have been sent to the target and the source replication engine could fail the refresh if a rollback occurs for a unit of replication containing the refreshed object.

Thus, prior to any log record images being written, the extract utility can create and write into the replication log the special 'start' refresh indicator to indicate the start of the utility including the objects being extracted. Prior to injecting the extracted source data into the replication log, the utility writes to the replication log the start refresh indicator, for instance as a record or other indication, which indicates to the replication engine commencement of the data refresh. The source engine could at that point notify the target (e.g. target replication engine) if appropriate. As noted, the start refresh indicator allows the source to request that the target clear or truncate the target data, or take any other desired behavior that a user has configured for a new refresh.

The end refresh indicator allows the replication engine to definitively end refresh for a given object and/or the in-scope object(s), and report success/failure of the refresh. The extract utility writing to the replication log the end refresh indicator that indicates to the replication engine an end of the data refresh allows the replication product to track the start and end of the refresh and adapt any processing desired to handle changes captured during refresh. In some situations, the start refresh indicator is a first start refresh indicator but a problem or other abnormality occurs such that the refresh is to be restarted. The utility can indicate to the replication engine a restart of the data refresh by writing to the replication log a second start refresh indicator prior to writing to the replication log an end refresh indicator that would correspond to the first start refresh indicator. Seeing this second refresh start indicator for the data store object without seeing a refresh end record for the prior refresh start indicator indicates a failure and that that the refresh is restarting. The source replication engine could indicate this to the target for handling in any desired manner. It could truncate the target, for example.

The start refresh indicator can also cause the replication engine to set a flag (e.g. the 'refresh while active' flag) in all of the records flowing to the target. Such a flag can be interpreted at the target replication engine for any desired purpose. As an example, special rules at the target could be followed if the flag is set, for instance rules for handling changes to source data that has not yet arrived. For example, an update occurring during the refresh may be sent with special flags to allow it to be applied with special apply logic to account for a different record image being found at the target.

Using a dirty read (i.e. reading without a lock) can be problematic since data could be rolled back, and existing replication engines do not invalidate a subscription or object if a rollback is seen in the replication log. Doing so is difficult since the replication product is to know if the rollback included data in-flight before the refresh started. This is possible to determine with an internal refresh, but not addressed by conventional replication engines. In contrast, aspects described herein provide a facility to use a dirty read of the source data while monitoring for rollbacks that could lead to unexpected data at the target. If a rollback occurs, the refresh could be invalidated and restarted.

As noted above, one approach would reuse (perhaps with modification) existing record format(s) (e.g. ISRT, WRITEADDCOMPLETE as examples) to an extent possible, which can help minimize the amount of changes required in the replication engine. The replication engine is to recognize the new user log records in any case and can be programmed in accordance with aspects described herein to do so and handle them as desired and as described herein. An example difference may be that inserts can be flagged as occurring while replication is active so the target engine knows to apply them with special rules. For some targets, the source engine may need to format a delete for the key before sending the new insert. There may be various ways to ensure the target record is replaced by the image represented by the extract utility's user log record.

Aspects described herein may additionally or alternatively be used as a validation utility. Validation could be useful when it is desired to know that the target copy is in sync with the source. This allows a user to prove the target replica or portions thereof is/are consistent with the source, and determine what differences exist, all without stopping replication or implementing their own method. Under an example approach, refresh records are injected into the replication log and sent to the target, optionally with an indication for the target that they are for validation purposes and/or indicating that they are not necessarily to be applied at the target. The records are sent for comparison of the extracted data at the source, incorporated into the send refresh records, to the data at the target. Such a validation utility in conjunction with the target server could force the target replica back in-sync with the source or perform any other desired action(s). This could occur while replication is ongoing. Thus, the target system can be configured to receive the extracted source data that is injected into the replication log and replicated to the target system, and validate, concurrent with the replicating of the changes made to the source data store, whether the target data store includes a replica of the extracted source data.

In addition, the validation could be scoped using the filtering features described above. A range/area/key refresh could be supported to provide a facility to verify that the target data within the specific filtered scope matches the source. The refresh records can thereby be used to confirm the target matches and, if not, logging the differences through, e.g. a conflict exit at the target. The admin or user can choose to know what the differences are and/or to force the target to match by applying the received data that is found not to match the target data, as examples.

The extract utility could include additional records for verification, for example by reading and counting all source children to verify unkeyed and non-uniquely keyed segment numbers match under a specific parent. Other information about hierarchy can also be included to further verify the contents.

Accordingly, described herein is an external utility that works in combination with an internal replication engine to address drawbacks of internal and external refresh approaches. Delivering a hybrid of external and internal refresh through replication log injection provides a concurrent, in-stream load in an active replication environment. Extracting source data and injecting the data into the replication log is performed concurrent with the replication facility recording changes in the replication log and the replication engine reading the replication log and sending the changes to the target system. This supports parallel refresh; multiple extracts in the log can be processed concurrently rather than serially. As an example, if there are two tables that are based off of second-level segments, both tables can be targeted for reading in real time. This could occur by running one instance of the extract utility that reads child segments, inserts them all into the replication log, and then the replication engine performing the parallel refresh for different objects (table A and table B). Alternatively, it could be accomplished by running two instances of the utility running that concurrently read the appropriate data from the data store and inject it into the replication log. The extract utility can additionally produce records recognized for multiple replication objects based on the same database to avoid multiple scans of the source data source. In addition, since the data used for refresh is injected in the replication log, users can restart the subscription after a transient error and effectively pick up where the refresh left off. This may be enabled via automatic restarts managed by the replication product. In a restart situation, a transient loss of connectivity to the target (or other short-lived failure) would not require restarting the refresh from the beginning; the replication engine and its log reader reposition using the bookmark and send data, including refresh records. As long as the extract utility has not failed, the refresh can pick up where it left off and complete without interruption. Furthermore, the data stays current via replication updates occurring while the extract batch job (refresh) is active, and latency associated with reading/processing other objects not being refreshed or keys in the object being refreshed is avoided while the refresh is active. In some embodiments the refresh utility operates while replication is active, though replication could instead be paused or stopped if desired. That is, it is possible to run the utility before starting up replication, if desired, whereby the utility writes into a replication log that the engine, once brought up with the rest of the replication facility on the server, will read to process and transmit the changes to the target.

Figure 4A:
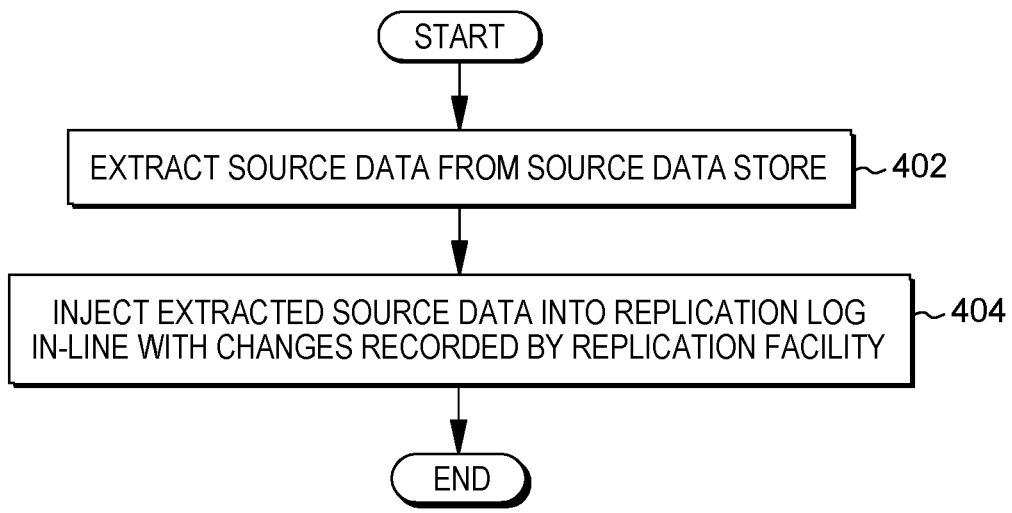
FIGS. 4A-4B depict example processes for in-stream data load in a replication environment, in accordance with aspects described herein.
Figure 4B:
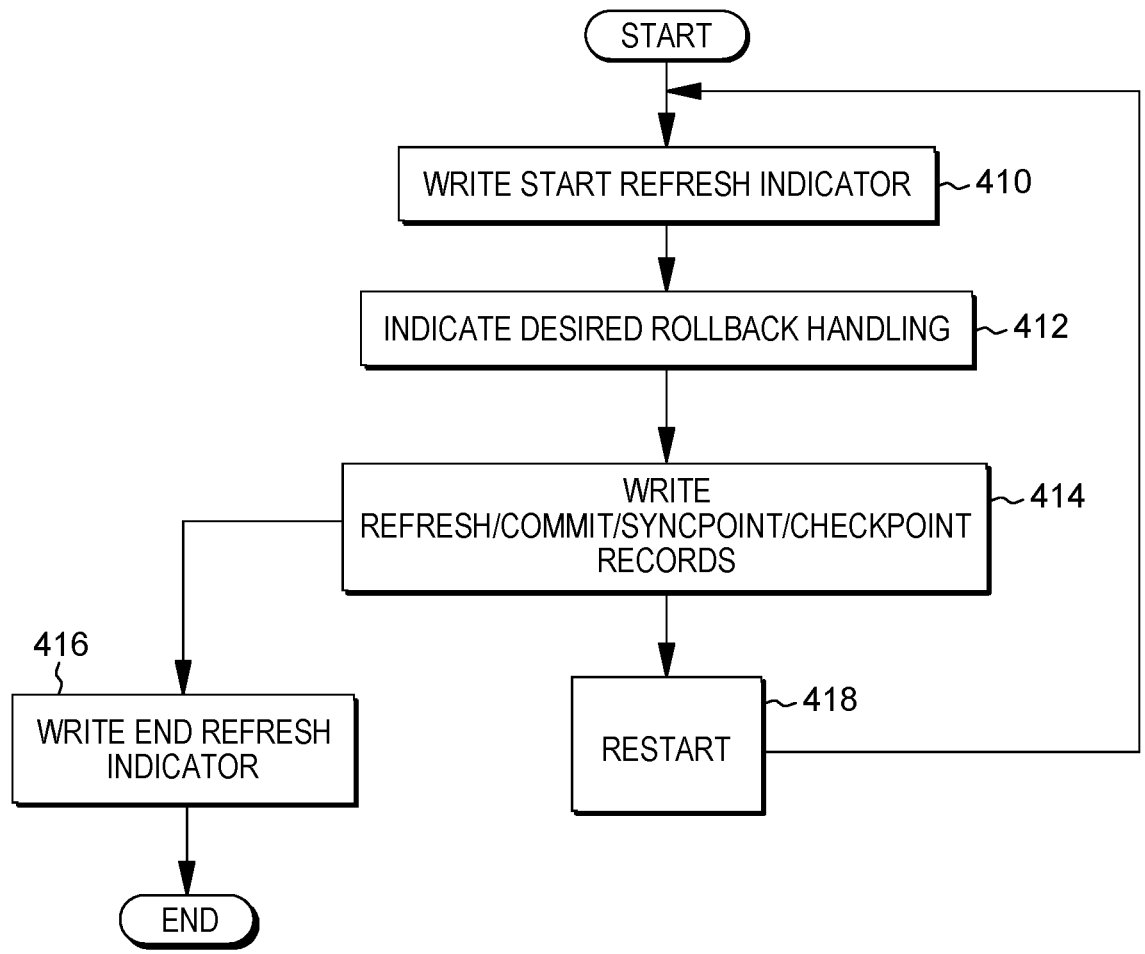

FIGS. 4A-4B depict example processes for in-stream data load in a replication environment, in accordance with aspects described herein. Aspects of the processes can be performed in whole or in part by one or more computer systems, such as those described herein, which may include one or more computer systems of or connected to a replication environment and/or one or more other computer systems.

Referring initially to FIG. 4A, the process begins by extracting (402) source data from a source data store. The source data store is in a replication relationship with a target data store, in which a replication facility replicates to a target system changes made to the source data store for application of those changes to the target data store. The replication facility includes a replication engine configured to read a replication log into which the replication facility records the changes and send the changes to the target system for application to the target data store. However, in the example process, the extracting is performed by an extract utility separate from the replication engine. For instance, the extract utility executes separately from the replication engine and its functions are not functions performed by the engine. In some examples, the utility is a completely different process and program from the replication facility of which the replication engine is a part.

The process continues by injecting (404), by the extract utility, the extracted source data into the replication log in-line with the changes recorded in the replication log by the replication facility. The injecting includes the extract utility injecting the extracted source data into the replication log according to a format that is configured for the replication engine to read and send the extracted source data to the target system. That is, the format is such that the replication engine is configured to read and send the extracted source data to the target system. Injecting the extracted source data according to the format configured for the replication engine to read and send the extracted source data to the target system could therefore include writing log records to the replication log in a format that is based on an existing insert record format recognized by the replication engine.

In some embodiments, the extracting (402) and the injecting (404) are performed as part of a data refresh, in which the target data store initially does not store the extracted source data and the extracted source data is seeded to the target data store as target data prior to applying replicated changes, which are passed to the target system pursuant to the replication relationship, that affect the seeded target data. The extracting and the injecting may therefore be performed concurrent with the replication facility recording the changes in the replication log and the replication engine reading the replication log and sending the changes to the target system.

In this regard, a refresh may be performed by way of an in-stream load of the refreshed data into the replication log while change replication is occurring. The utility can be configured to write refresh records, for instance those described with reference to FIG. 4B.

In a refresh scenario, and prior to injecting (404) the extracted source data into the replication log, the process writes (410) to the replication log a start refresh indicator that indicates to the replication engine commencement of the data refresh. Optionally the utility could indicate desired rollback handling by, e.g., indicating (412) to the replication engine whether to examine for a rollback impacting the source data store and, if so, whether to abort the data refresh based on observing a rollback. At that point, the process extracts data from the source data store and writes some number of refresh records based on the contents of the source data store. In conjunction with this, the utility can, in some embodiments, write commit/syncpoint records into the log as it releases source locks or creates batches of refresh records for the target by writing checkpoints indicating completion of unit(s) of recovery for the data refresh. Additionally or alternatively, the replication engine receives refresh records as "autocommit" and is free to batch the refresh however it deems best. Thus, the process proceeds to 414 and writes refresh records to inject the extracted source data and (optionally) commit/syncpoint/checkpoint records. This may be an ongoing aspect while the refresh is ongoing.

Eventually the process proceeds to either end the refresh or to restart the refresh, for instance because of a problem. In the former situation, the process proceeds by writing (416) to the replication log an end refresh indicator that indicates to the replication engine an end of the data refresh. In the latter situation, the start refresh indicator written at 410 is a first start refresh record, and, after a failure when the utility is restarted, as an example, a restart (418) is encountered, which returns the process to 410 to write a (second) start refresh indicator to the replication log before any end refresh indicator corresponding to the first start refresh indicator is written. In this situation, no corresponding end refresh indicator corresponding to the first start refresh indicator is written into the replication log, yet the process has returned to 410 to write another start refresh to indicate to the replication engine a restart of the data refresh.

As an enhancement, filtering is also provided. For instance, in some embodiments the extract utility is a first extract utility of a plurality of concurrently executing extract utilities each associated with a different key range or database area filter than is associated with the other extract utilities of the plurality of extract utilities. The concurrently executing extract utilities are configured to each extract a respective set of source data from the source data store according to its associated key range or database area filter. In other words, each of the concurrently executing extract utilities extracts the source data indicated by the key range/database area filter associated with the given extract utility.

Additionally or alternatively, extracting the source data can include first extracting from the source data store an initial set of source data, and then filtering the extracted initial set of source data into the extracted source data that is injected into the replication log. The filtering can be performed according to a scope of records, in the source data store, that are targeted for processing. As an example, extracting the source data is performed in a single scan of the source data store. The scope of records to be filtered can include multiple replication objects that are scanned during the single scan. The injecting injects records into the replication log for the extracted source data recognized for each of the multiple replication objects that are the subject of the filtering. Example such replication objects can be multiple Virtual Storage Access Method (VSAM) records and/or multiple Information Management System (IMS) database segments, as examples.

In some embodiments, the target system is configured to receive the extracted source data that is injected into the replication log and replicated to the target system and validate, concurrent with the replication of the changes made to the source data store, whether the target data store includes a replica of that extracted source data that is passed to the target system. As an example, a replication engine of the target system or other software receives and/or processes the received extracted source data to perform the validation.

Although various examples are provided, variations are possible without departing from a spirit of the claimed aspects.

Figure 5:
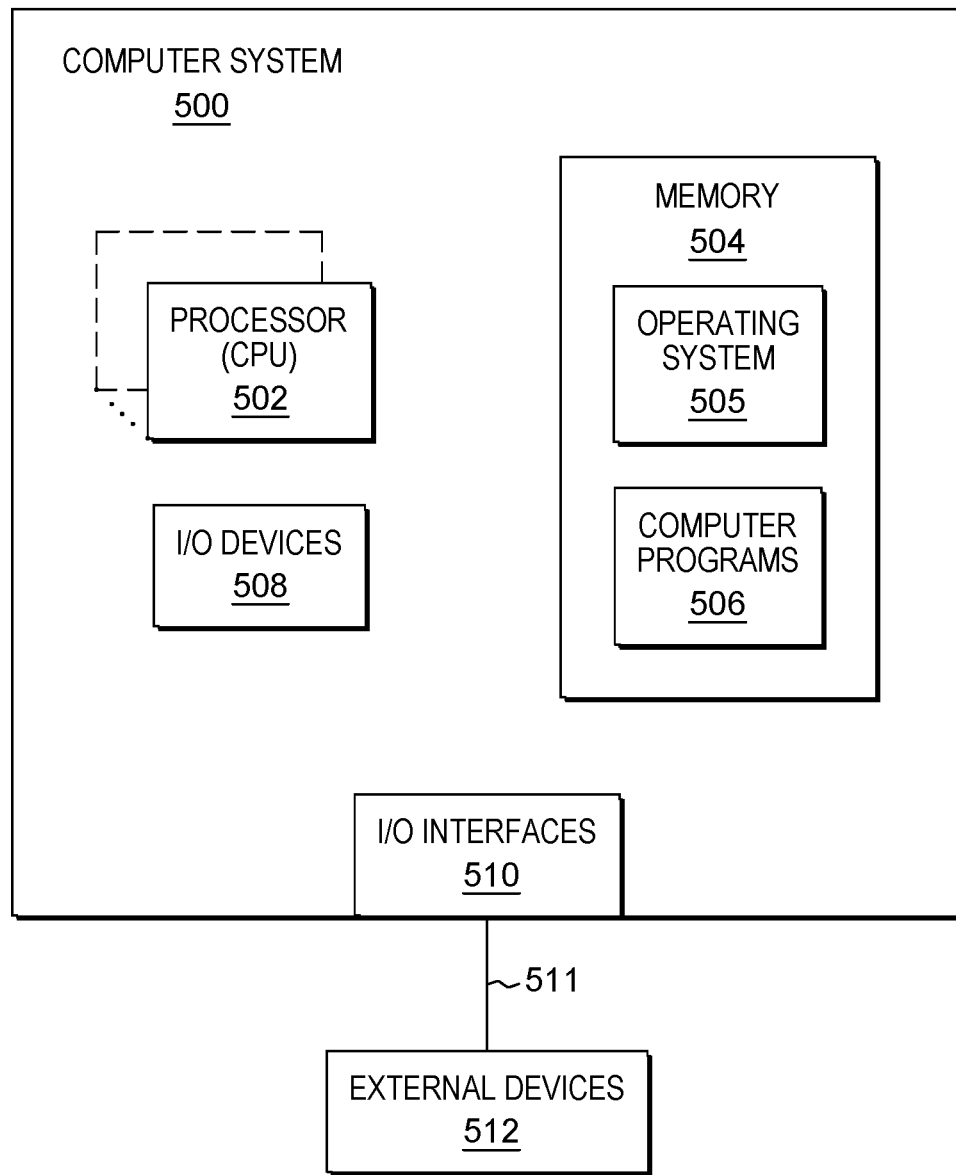
FIG. 5 depicts one example of a computer system and associated devices to incorporate and/or use aspects described herein.

Processes described herein may be performed singly or collectively by one or more computer systems, such as one or more servers of a replication environment. FIG. 5 depicts one example of such a computer system and associated devices to incorporate and/or use aspects described herein. A computer system may also be referred to herein as a data processing device/system, computing device/system/node, or simply a computer. The computer system may be based on one or more of various system architectures and/or instruction set architectures, such as those offered by International Business Machines Corporation (Armonk, N.Y., USA), Intel Corporation (Santa Clara, Calif., USA) or ARM Holdings plc (Cambridge, England, United Kingdom), as examples.

FIG. 5 shows a computer system 500 in communication with external device(s) 512. Computer system 500 includes one or more processor(s) 502, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 502 can also include register(s) to be used by one or more of the functional components. Computer system 500 also includes memory 504, input/output (I/O) devices 508, and I/O interfaces 510, which may be coupled to processor(s) 502 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 504 can be or include main or system memory (e.g. Random Access Memory) used in the execution of program instructions, storage device(s) such as hard drive (s), flash media, or optical media as examples, and/or cache memory, as examples. Memory 504 can include, for instance, a cache, such as a shared cache, which may be coupled to local caches (examples include L1 cache, L2 cache, etc.) of processor(s) 502. Additionally, memory 504 may be or include at least one computer program product having a set (e.g., at least one) of program modules, instructions, code or the like that is/are configured to carry out functions of embodiments described herein when executed by one or more processors.

Memory 504 can store an operating system 505 and other computer programs 506, such as one or more computer programs/applications that execute to perform aspects described herein. Specifically, programs/applications can include computer readable program instructions that may be configured to carry out functions of embodiments of aspects described herein.

Examples of I/O devices 508 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (512) coupled to the computer system through one or more I/O interfaces 510.

Computer system 500 may communicate with one or more external devices 512 via one or more I/O interfaces 510. Example external devices include a keyboard, a pointing device, a display, and/or any other devices that enable a user to interact with computer system 500. Other example external devices include any device that enables computer system 500 to communicate with one or more other computing systems or peripheral devices such as a printer. A network interface/adapter is an example I/O interface that enables computer system 500 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Wash., U.S.A.).

The communication between I/O interfaces 510 and external devices 512 can occur across wired and/or wireless communications link(s) 511, such as Ethernet-based wired or wireless connections. Example wireless connections include cellular, Wi-Fi, Bluetooth®, proximity-based, near-field, or other types of wireless connections. More generally, communications link(s) 511 may be any appropriate wireless and/or wired communication link(s) for communicating data.

Particular external device(s) 512 may include one or more data storage devices, which may store one or more programs, one or more computer readable program instructions, and/or data, etc. Computer system 500 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 500 may be operational with numerous other general purpose or special purpose computing system environments or configurations. Computer system 500 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
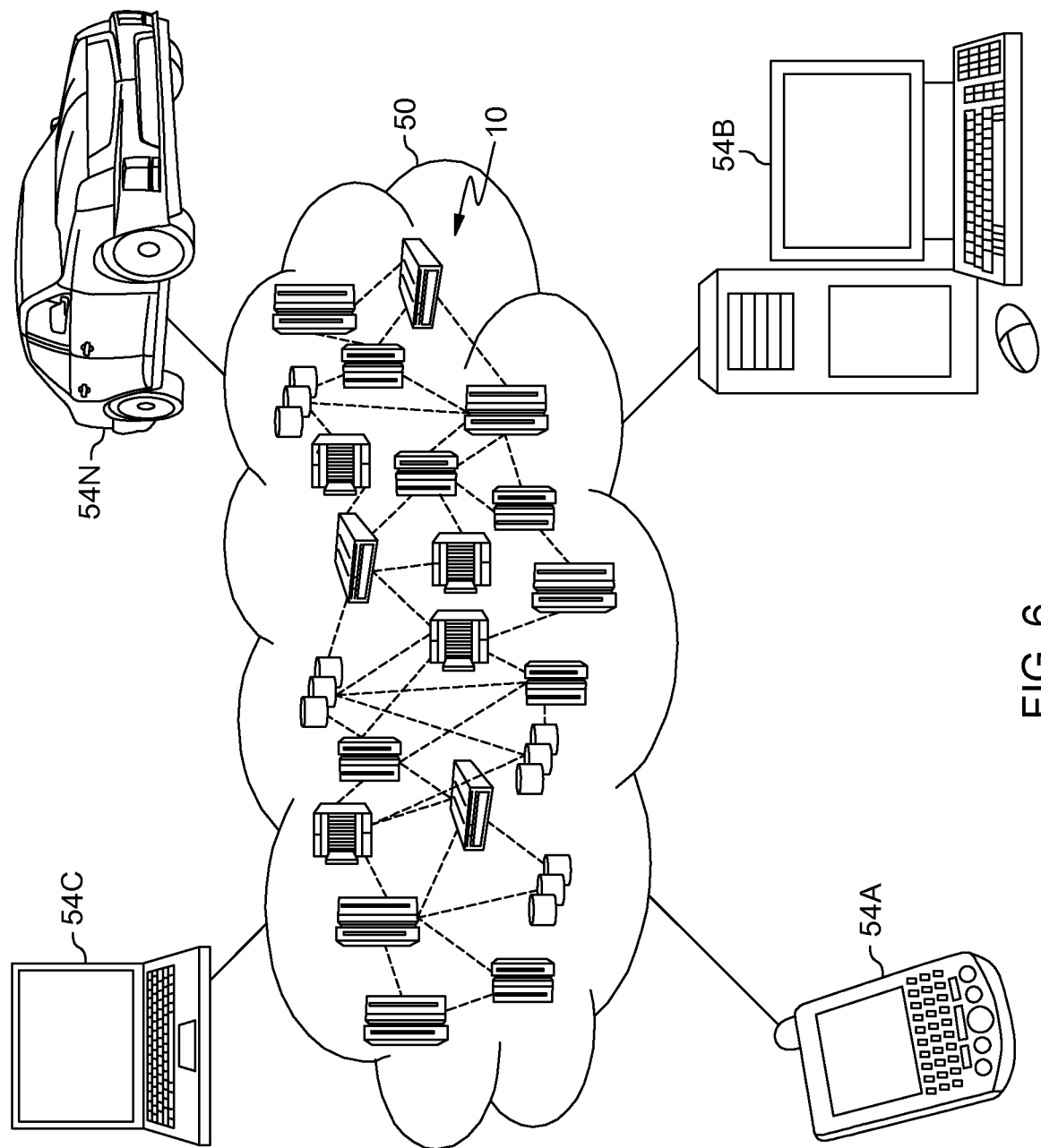
FIG. 6 depicts a cloud computing environment according to an embodiment of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
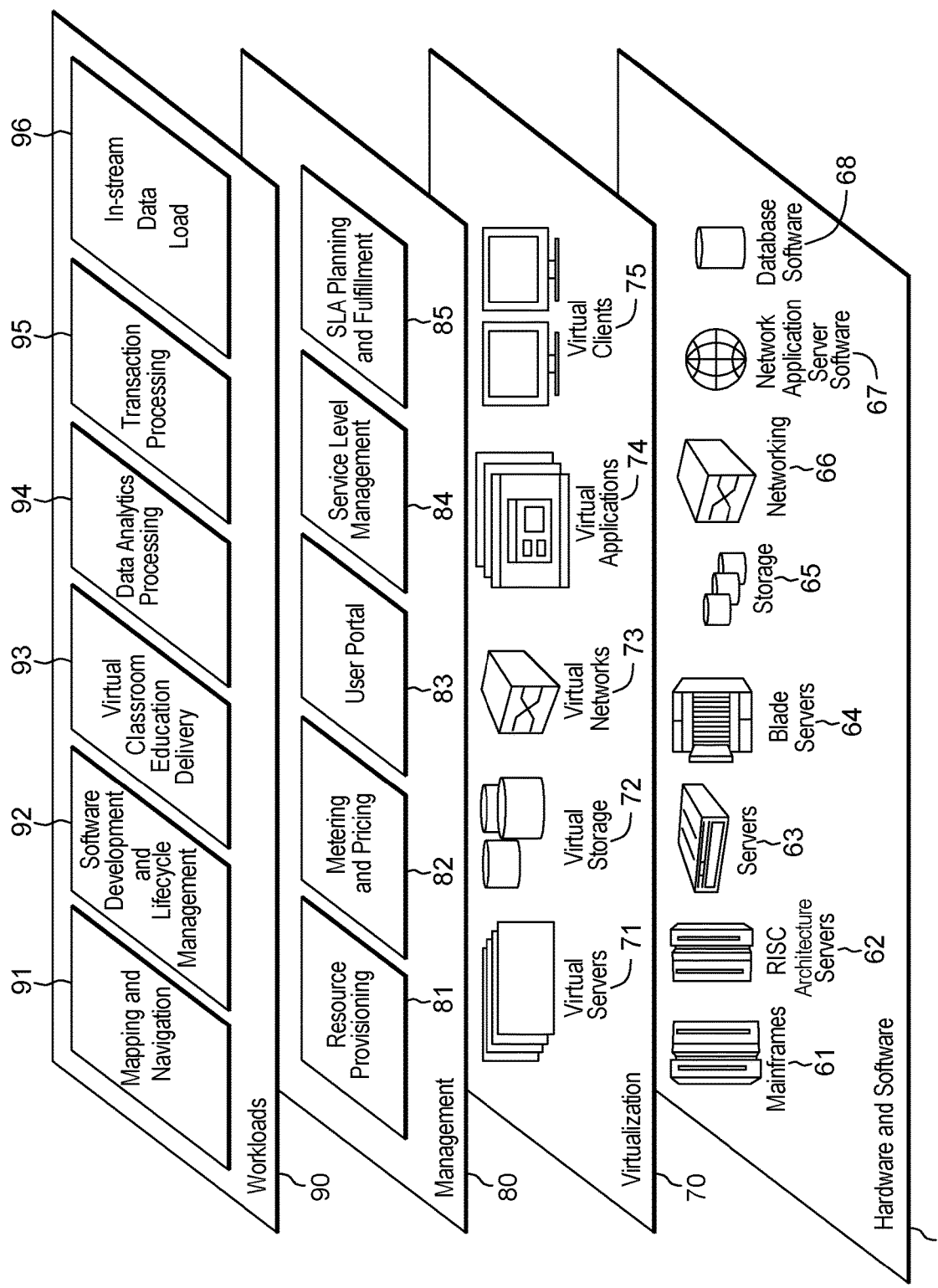
FIG. 7 depicts abstraction model layers according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and in-stream data load 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
   extracting source data from a source data store, the source data store being in a replication relationship with a target data store, in which a replication facility replicates to a target system changes made to the source data store for application of those changes to the target data store, the replication facility comprising a replication engine configured to read a replication log into which the replication facility records the changes and send the changes to the target system for application to the target data store, wherein the extracting is performed by an extract utility separate from the replication engine; and
   injecting, by the extract utility, the extracted source data into the replication log in-line with the changes recorded in the replication log by the replication facility, wherein the injecting comprises the extract utility injecting the extracted source data into the replication log according to a format configured for the replication engine to read and send the extracted source data to the target system, and wherein the extracting and the injecting are performed concurrent with the replication facility recording the changes in the replication log and the replication engine reading the changes from the replication log and sending the changes read directly from the replication log to the target system.

2. The method of claim 1, wherein the extracting and the injecting are performed as part of a data refresh, in which the target data store initially does not store the extracted source data and the extracted source data is seeded to the target data store as target data prior to applying replicated changes, passed to the target system pursuant to the replication relationship, affecting the seeded target data.

3. The method of claim 2, further comprising, prior to injecting the extracted source data into the replication log, writing to the replication log a start refresh indicator that indicates to the replication engine commencement of the data refresh.

4. The method of claim 3, further comprising writing to the replication log an end refresh indicator that indicates to the replication engine an end of the data refresh.

5. The method of claim 3, wherein the start refresh indicator is a first start refresh indicator, and wherein the method further comprises indicating to the replication engine a restart of the data refresh by writing to the replication log a second start refresh indicator prior to writing to the replication log an end refresh indicator corresponding to the first start refresh indicator.

6. The method of claim 2, further comprising indicating to the replication engine whether to examine for a rollback impacting the source data store and, if so, whether to abort the data refresh based on observing a rollback.

7. The method of claim 2, further comprising periodically writing to the replication log a checkpoint record indicating completion of a unit of recovery for the data refresh.

8. The method of claim 1, wherein the extract utility is a first extract utility of a plurality of concurrently executing extract utilities each associated with a different key range or database area filter than is associated with the other extract utilities of the plurality of extract utilities, and wherein the concurrently executing extract utilities are configured to each extract a respective set of source data from the source data store according to its associated key range or database area filter.

9. The method of claim 1, wherein the extracting the source data comprises extracting from the source data store an initial set of source data, and filtering the extracted initial set of source data into the extracted source data, the filtering being according to a scope of records, in the source data store, targeted for processing.

10. The method of claim 9, wherein the extracting the source data is performed in a single scan of the source data store, wherein the scope includes multiple replication objects scanned during the single scan, wherein the injecting injects records into the replication log for the extracted source data recognized for each of the multiple replication objects, and wherein the multiple replication objects are selected from the group consisting of: multiple Virtual Storage Access Method (VSAM) records, and multiple Information Management System (IMS) database segments.

11. The method of claim 1, wherein the injecting the extracted source data according to the format configured for the replication engine to read and send the extracted source data to the target system comprises writing log records to the replication log in a format based on an existing insert record format recognized by the replication engine.

12. The method of claim 1, wherein the target system is configured to receive the extracted source data that is injected into the replication log and replicated to the target system, and validate, concurrent with the replicating the changes made to the source data store, whether the target data store includes a replica of the extracted source data.

13. A computer system comprising:
a memory; and
a processor in communication with the memory, wherein the computer system is configured to perform a method comprising:
extracting source data from a source data store, the source data store being in a replication relationship with a target data store, in which a replication facility replicates to a target system changes made to the source data store for application of those changes to the target data store, the replication facility comprising a replication engine configured to read a replication log into which the replication facility records the changes and send the changes to the target system for application to the target data store, wherein the extracting is performed by an extract utility separate from the replication engine; and
injecting, by the extract utility, the extracted source data into the replication log in-line with the changes recorded in the replication log by the replication facility, wherein the injecting comprises the extract utility injecting the extracted source data into the replication log according to a format configured for the replication engine to read and send the extracted source data to the target system, and wherein the extracting and the injecting are performed concurrent with the replication facility recording the changes in the replication log and the replication engine reading the changes from the replication log and sending the changes read directly from the replication log to the target system.

14. The computer system of claim 13, wherein the extract utility is a first extract utility of a plurality of concurrently executing extract utilities each associated with a different key range or database area filter than is associated with the other extract utilities of the plurality of extract utilities, and wherein the concurrently executing extract utilities are configured to each extract a respective set of source data from the source data store according to its associated key range or database area filter.

15. The computer system of claim 13, wherein the extracting the source data comprises extracting from the source data store an initial set of source data, and filtering the extracted initial set of source data into the extracted source data, the filtering being according to a scope of records, in the source data store, targeted for processing, wherein the extracting the source data is performed in a single scan of the source data store, wherein the scope includes multiple replication objects scanned during the single scan, wherein the injecting injects records into the replication log for the extracted source data recognized for each of the multiple replication objects, and wherein the multiple replication objects are selected from the group consisting of: multiple Virtual Storage Access Method (VSAM) records, and multiple Information Management System (IMS) database segments.

16. The computer system of claim 13, wherein the target system is configured to receive the extracted source data that is injected into the replication log and replicated to the target system, and validate, concurrent with the replicating the changes made to the source data store, whether the target data store includes a replica of the extracted source data.

17. A computer program product comprising:
a computer readable storage medium readable by a processing circuit and storing instructions for execution by the processing circuit for performing a method comprising:
extracting source data from a source data store, the source data store being in a replication relationship with a target data store, in which a replication facility replicates to a target system changes made to the source data store for application of those changes to the target data store, the replication facility comprising a replication engine configured to read a replication log into which the replication facility records the changes and send the changes to the target system for application to the target data store, wherein the extracting is performed by an extract utility separate from the replication engine; and
injecting, by the extract utility, the extracted source data into the replication log in-line with the changes recorded in the replication log by the replication facility, wherein the injecting comprises the extract utility injecting the extracted source data into the replication log according to a format configured for the replication engine to read and send the extracted source data to the target system, and wherein the extracting and the injecting are performed concurrent with the replication facility recording the changes in the replication log and the replication engine reading the changes from the replication log and sending the changes read directly from the replication log to the target system.

18. The computer program product of claim 17, wherein the extract utility is a first extract utility of a plurality of concurrently executing extract utilities each associated with a different key range or database area filter than is associated with the other extract utilities of the plurality of extract utilities, and wherein the concurrently executing extract utilities are configured to each extract a respective set of source data from the source data store according to its associated key range or database area filter.

19. The computer program product of claim 17, wherein the extracting the source data comprises extracting from the source data store an initial set of source data, and filtering the extracted initial set of source data into the extracted source data, the filtering being according to a scope of records, in the source data store, targeted for processing, wherein the extracting the source data is performed in a single scan of the source data store, wherein the scope includes multiple replication objects scanned during the single scan, wherein the injecting injects records into the replication log for the extracted source data recognized for each of the multiple replication objects, and wherein the multiple replication objects are selected from the group consisting of: multiple Virtual Storage Access Method (VSAM) records, and multiple Information Management System (IMS) database segments.

\* \* \* \* \*